United States Patent [19]

Talmadge

[11] 4,095,896
[45] Jun. 20, 1978

[54] ADAPTIVE GRATING RATE CONTROL

[75] Inventor: Paul Conway Talmadge, Ansonia, Conn.

[73] Assignee: The Perkin-Elmer Corporation, Norwalk, Conn.

[21] Appl. No.: 684,978

[22] Filed: May 10, 1976

[51] Int. Cl.$^2$ ............................................... G01J 3/42
[52] U.S. Cl. ....................................... 356/89; 356/93; 356/95
[58] Field of Search ........................ 356/89, 88, 93, 95

[56] References Cited

U.S. PATENT DOCUMENTS

| 3,176,576 | 4/1965 | Sundstrom et al. | 356/89 |
| 3,459,479 | 8/1969 | Sundstrom et al. | 356/89 |
| 3,486,823 | 12/1969 | Matthews | 356/89 |
| 4,000,946 | 1/1977 | Way et al. | 356/89 |

*Primary Examiner*—Vincent P. McGraw
*Attorney, Agent, or Firm*—S. A. Giarratana; F. L. Masselle; J. D. Crane

[57] ABSTRACT

In a double beam, optical-null type infra red spectrophotometer, an optical system including a movable dispersive optical element causes transmission of a spectrum of light in respective beams through an adjustable optical attenuator and through a sample and thence to a sensing circuit. The sensing circuit provides an error voltage having an amplitude proportional to the difference between the intensites of the beams passing through the sample and through the attenuator respectively. The position of the attenuator is adjusted in proportion to the integral of the error voltage to cause a reduction thereof while, in response to the magnitude of the error voltage in excess of a threshold value, there is a reduction in the rate of movement of the dispersive element.

3 Claims, 1 Drawing Figure

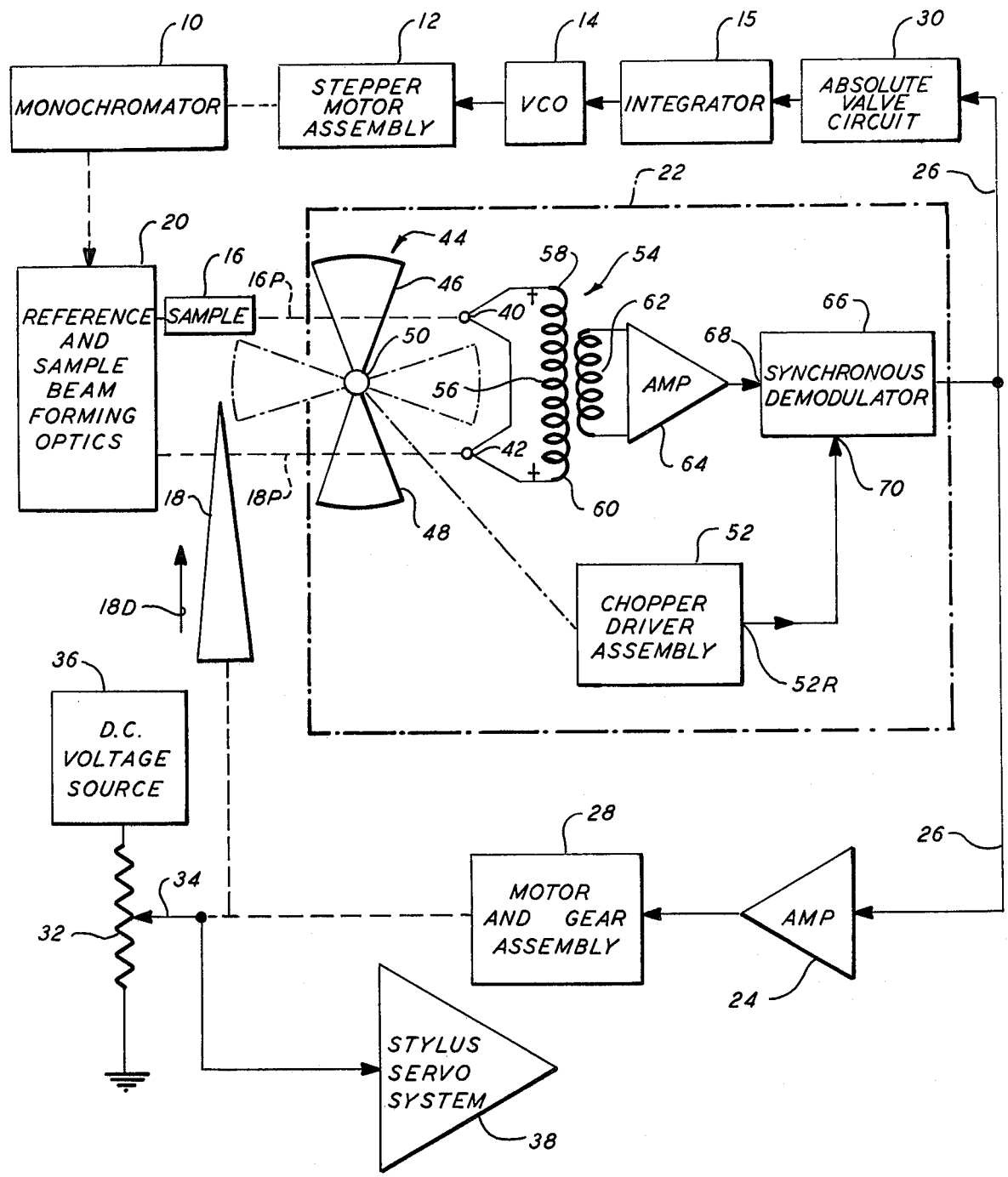

ADAPTIVE GRATING RATE CONTROL

BACKGROUND OF THE INVENTION

1. Field of the Invention

This invention relates generally to analytical optical instruments, particularly spectrophotometers, and more specifically to spectrophotometers which incorporate a monochromator for producing light in a range of wavelengths.

2. Description of the Prior Art

The analytical function of spectrophotometric instruments is achieved by measuring light of selected wavelengths absorbed or emitted by an unknown sample composition. Conventionally, light from a spectral source is passed through a monochromator which contains a dispersive element such as a diffraction grating. Light entering the monochromator strikes the grating and is dispersed to form a light spectrum which is optically conducted to impinge on a narrow exit slit which limits the light issuing from the monochromator at a given instant to a very narrow band of wavelengths. The dispersion element is angularly displaceable to vary the portion of the spectrum impinging on the slit and thereby produces what is known as a "wavelength scan".

In a double-beam null type instrument to which the present invention is addressed, light emanating from the monochromator is split into a sample beam and a reference beam; the sample beam is transmitted through a cell containing the unknown sample composition whereas the reference beam bypasses the sample. A servo motor-controlled optical attenuator member is adjustably disposed in the path of the reference beam. The respective intensities of the sample and reference beams are sensed by suitable detectors and the intensity of the sample beam compared with that of the reference beam to generate an error signal fed back to the servo motor drive which moves the attenuator so as to achieve a null condition. The position of the attenuator therefore is representative of the intensity of the sample beam and, in a typical instrument, the attenuator is coupled to effect ordinate displacement of the stylus of a strip chart recorder, the abscissa of the chart corresponding to the instaneous wavelength of radiation from the monochromator.

It is well known that the intensity of the light issuing from the monochromator, even over the relatively narrow band of frequencies constituting the spectral line for a given angular position of the dispersion element, has a generally Gaussian distribution. Consequently, if, as is the case in prior art instruments, the wavelength scan is accomplished at a uniform rate, it is not possible to adjust the position of the attenuator as rapidly as the changes of intensity occur during certain portions of the scan thereby causing the position of the attenuator to be an inexact representation of the detector sample beam.

SUMMARY OF THE INVENTION

It is the basic general object of the present invention to provide a spectrophotometer which allows rapid scanning of a spectrum while keeping the accuracy within set limits.

Another objective is the provision of an improved spectrophotometer which automatically optimizes the rate of wavelength scan so that no adjustment is necessary.

To the accomplishment of these objects as well as other objects and advantages which will become apparent as this description proceeds, the invention contemplates an improvement in spectrophotometric apparatus which has means for scanning a spectrum to produce radiation of varying wavelengths, means for forming of said radiation a sample beam and a reference beam, means for detecting and comparing the respective intensitities of the sample and reference beams to generate an error signal, and an optical attenuator for varying the intensity of the reference beam in response to such error signal so as to minimize the difference in intensity of the reference and sample beams. The improvement contemplated comprises means for reducing the rate of scanning of the spectrum in response to a signal proportional to an integral of the difference in intensity exceeding an intensity threshold.

BRIEF DESCRIPTION OF THE DRAWING

The sole FIGURE of the annexed drawing is a schematic block diagram of a preferred embodiment of the present invention.

DESCRIPTION OF THE PREFERRED EMBODIMENT

The present invention is predicated upon an error in the position of a movable element of a feedback control system being reduced in response to a reduction of the rate of change of an input to the system. It is described herein as applied to an infra red spectrophotometer but it will be appreciated that this is by way of an example and not limitation.

Referring now to the drawing, a monochromator 10 has a dispersive optical element (not shown) which is coupled to an output shaft of a stepper motor drive assembly 12. The monochromator 10 provides a spectrum of IR radiation when the output of drive assembly 12 moves the dispersive element from a first position to a second position.

The output shaft of the motor assembly 12 is rotated through a known angle in response to a voltage pulse being applied to an input of the motor assembly 12. Because the output shaft of the motor assembly 12 is coupled to the dispersive element, the rotation through the known angle causes an increment of movement of the dispersive element.

The input of the motor assembly 12 is connected to a voltage controlled oscillator 14 at an output thereof. Oscillator 14 has an input to which an integrated control voltage is applied. In response to the integrated control voltage having an amplitude less than a threshold amplitude, the output of the oscillator 14 provides pulses of voltage at a known frequency. In response to the amplitude of the control voltage exceeding the threshold amplitude, the pulses are provided at a frequency inversely proportional to the amplitude of the integrated control voltage. Accordingly, the dispersive element is moved at a rate inversely proportional to the amplitude of the integrated control voltage when the amplitude of the control voltage exceeds the threshold amplitude. The control voltage is provided in a manner explained hereinafter.

Radiation from monochromator 10 passes through beam-forming optics 20 which form a sample beam 16P transmitted through a sample 16 and a reference beam 18P controlled by an attenuator 18.

Attenuator 18 is movable in either a direction indicated by an arrow 18D or a direction opposite there-from. In response to a position of the attenuator 18 being changed by a movement in the direction indicated by the arrow 18D, there is a reduction in the intensity of the attenuated radiation; in response to the position of the attenuator 18 being changed by a movement in the opposite direction, there is an increase in the intensity of the reference beam.

Sample and reference beams 16P, 18P are received by a detector system generally designated 22, which provides an error voltage proportional to the difference between the intensities of the two beams. Detector system 22 is described hereinafter.

When the intensity of the reference beam exceeds the intensity of the sample beam, the error voltage is of a positive polarity. Correspondingly, when the intensity of the reference beam is less than the intensity of the sample beam, the error voltage is of a negative polarity. In other words, sensing system 22 compares radiation transmitted along the path 16P with radiation transmitted along the path 18P, the error voltage being provided in response to the comparison. Of course, when the error voltage is zero volts, the position of the attenuator 18 is representative of the intensity of the sample beam.

The output of detector system 22 is connected to an amplifier 24 at an input thereof through a signal line 26 thereby providing the error voltage to the amplifier. Amplifier 24 provides an excitation voltage proportional to the error voltage, which is suitable for driving a motor. The output of amplifier 24 is connected to a motor and gear box assembly 28 whereby the amplifier provides the excitation voltage to assembly 28.

The motor gear box assembly 28 has an output member, such as a rack of a rack and pinion arrangement (not shown), coupled to attenuator 18. In response to the error voltage being positive, the excitation voltage causes the output member of the motor assembly 28 to move the attenuator 18 in the direction indicated by the arrow 18D, thereby reducing the error voltage. Similarly, in response to the error voltage being negative, the excitation voltage causes the motor assembly 28 to move the attenuator 18 in the direction opposite from the direction indicated by the arrow 18D, thereby reducing the error voltage. Accordingly, attenuator 18, detector system 22, amplifier 24 and motor assembly 28 are all in a feed-back loop where the attenuator is moved in a direction which reduces the error voltage thereby tending to make the position of the attenuator representative of the intensity of the sample beam.

The output of detector system 22 is additionally connected to the input of an absolute value circuit 30 through the line 26. Absolute value circuit 30 provides at an output thereof the control voltage referred to hereinbefore. The control voltage has a positive polarity, with the magnitude of the control voltage being substantially equal to the magnitude of the error voltage. Absolute value circuits are well known to those skilled in the art.

The output of the absolute value circuit 30 is connected via an integrator 15 to the input of oscillator 14 whereby the integral of the control voltage is applied to the oscillator. According to the present invention, when the magnitude of the error voltage exceeds the threshold amplitude, the rate of the movement of the dispersive element is reduced. Since the error voltage is proportional to the difference between the intensities of the reference beam and the sample beam, the threshold amplitude corresponds to a threshold difference of intensities between the two beams.

To provide the representation of the sample beam intensity, the output member of the motor assembly 28 is additionally coupled to a potentiometer 32 at a wiper arm 34 thereof. Potentiometer 32 has one side connected to a DC voltage source 36 and the other side connected to a ground whereby the voltage of the source 36 is applied to the potentiometer 32.

When the motor assembly 28 causes change of the position of the attenuator 18, there is a corresponding change of a position of the wiper arm 34. Therefore, attenuator 18 and wiper arm 34 have corresponding positions. Because wiper arm 34 and attenuator 18 have corresponding positions, the wiper arm provides a position voltage corresponding to the position of the attenuator.

Wiper 34 is connected to a stylus servo 38 of a strip chart recorder (not shown), thereby applying the position voltage to an input of the stylus servo 38. In response to the position voltage, stylus servo 38 provides ordinate deflection of a stylus of the recorder to a position corresponding to the position of the attenuator 18. As previously mentioned, the chart abscissa represents wavelength.

In the sensing circuit referred to hereinbefore, radiation along the paths 16P, 18P is transmitted to suitable detectors 40, 42, respectively, via a rotating chopper 44. In an infra red spectrophotometer, detectors 40, 42 typically are thermopiles. Thermopiles 40, 42 are of the type which have a series of junctions and generate a DC voltage having an amplitude proportional to the temperature of the junctions. It should be appreciated that when radiation is transmitted to the junction, there is an increase in the temperature thereof. In this embodiment, thermopiles 40, 42 are connected as series aiding voltage sources whereby the thermopiles provide a collectively generated voltage.

As explained hereinafter, the sample beam and the reference beam are simultaneously and periodically occluded with respect to thermopiles 40, 42 at a constant carrier frequency. Because of the occlusion of the carrier frequency, the collectively generated voltage is an AC voltage having a phase and an amplitude corresponding to a difference of the temperature of the thermopile 40 from the temperature of the thermopile 42. The occlusion is provided by beam chopper 44.

Chopper 44 is comprised of similar opaque blades 46, 48 which are fixedly mounted on a rotatable shaft 50 coupled to a chopper driver assembly 52. When shaft 50 is in a first angular position, (blades 46, 48 shown in full lines) the sample and reference beams are occluded with respect to thermopiles 40, 42. When the shaft 52 is in second position, (blades 46, 48 shown in broken lines) both beams are transmitted to the respective thermopiles.

The chopper driver assembly 52 rotates shaft 50 to cause blades 46, 48 to interrupt the sample and reference beams at the carrier frequency. Chopper driver assembly 52 additionally provides at a reference output 52R thereof a carrier reference voltage at carrier frequency. The reference voltage is used in a manner to be explained presently.

Thermopiles 40, 42 are connected to a transformer 54 at a primary winding 56 through signal lines 59, 60, respectively, whereby the collectively generated voltage is applied to the winding 56.

When radiation is not transmitted along the paths 16P, 18P, the respective temperatures of thermopiles 40, 42 are substantially the same thereby causing the collectively generated voltage to equal zero volts. Therefore, during periods of occlusion, the collectively generated voltage is zero volts.

When the beams are transmitted by chopper 44 and the intensity of of the reference beam is greater than the intensity of the sample beam, the collectively generated voltage is characterized by the line 60 being more positive than the line 56. Because chopping is at the carrier frequency, when the intensity of the reference beam is greater than intensity of the sample beams, the collectively generated voltage includes an AC voltage component which is in phase with the carrier reference voltage.

For reasons similar to those given hereinbefore, when the intensity of the reference beam is less than the intensity of the sample beam, the collectively generated voltage includes an AC voltage component which is out of phase with the carrier reference voltage. It should be understood that the amplitude of the AC voltage component is proportional to the difference between the intensities of the sample and reference beams.

Transformer 54 has a secondary winding 62 connected to an amplifier 64 at an input thereof whereby the AC voltage component is coupled to the amplifier. Thus, amplifier 64 provides, at an output thereof, an amplified voltage proportional to the AC voltage component.

The output of the amplifier 64 is connected to a synchronous demodulator 66 at a signal input 68 thereof. Additionally, demodulator 66 has a reference input 70 connected to the output 52R whereby the carrier reference voltage is applied to reference input 70. In concurrent response to the amplifier AC voltage component and the carrier reference voltage, demodulator 66 generates the error voltage.

Demodulator 66 has an output connected to the absolute value circuit 30 and the amplifier 24 through the line 26 whereby the error voltage is provided thereto.

Although the invention has been shown and described with respect to a preferred embodiment thereof, specifically an infra red spectrophotometer, it should be understood by those skilled in the art that various changes and omissions in the form and detail thereof may be made therein without departing from the spirit and scope of the invention.

What is claimed is:

1. In a spectrophotometric apparatus including means for scanning a spectrum to produce radiation of monotonically varying wavelength, means for forming of said radiation a sample beam and a reference beam, means for detecting and comparing the respective intensities of said sample and reference beams to generate an error signal representative of the difference in intensity of said beam, the improvement comprising feedback means for conlrotting the scanning rate of said scanning means as a function of the integral of said error signal when said error signal has a magnitude above a threshold.

2. Spectrophotometric apparatus comprising:
    means for scanning a spectrum to produce radiation of monotonically varying wavelengths;
    means for forming of said radiation a sample beam and a reference beam;
    means for detecting and comparing the respective intensities of said sample and reference beams to generate an error signal;
    an optical attenuator for varying the intensity of said reference beam in response to said error signal so as to minimize the difference in intensity between said beams; and
    means for controlling the scanning rate of said scanning means in response to a signal proportional to an integral of said difference in excess of an intensity threshold.

3. Apparatus according to claim 2 wherein said scanning means is a dispersive optical element coupled to a stepper motor assembly which causes increments of angular movement of said dispersive element in response to a signal pulse and said rate reducing means comprises:
    an absolute value circuit having an input coupled to the output of said detecting and comparing means, said absolute circuit providing a control signal of known polarity;
    an integrator circuit having an input coupled to the output of said absolute value circuit, said integrator providing a signal proportional to the integral of said difference; and
    a voltage-controlled oscillator connected to provide signal pulses to said stepper motor assembly in response to said integrator output signal, said signal pulses being provided at a known frequency in response to the amplitude of said control signal being less than a threshold amplitude, said signal pulses being provided at a frequency inversely proportional to the amplitude of said control signal in response to the amplitude of said control signal being greater than said threshold amplitude.

* * * * *

UNITED STATES PATENT OFFICE
CERTIFICATE OF CORRECTION

Patent No. 4,095,896     Dated June 20, 1978

Inventor(s) Paul Conway Talmadge

It is certified that error appears in the above-identified patent and that said Letters Patent are hereby corrected as shown below:

Column 2, line 31, after "of" omit -- an --.

Column 2, line 54, after "of the" insert -- integrated --.

Column 5, line 8, after "Intensity of" omit -- of --.

Column 6, line 7, change "conlrotting" to -- controlling --.

Signed and Sealed this

Fifth Day of December 1978

[SEAL]

Attest:

RUTH C. MASON
Attesting Officer

DONALD W. BANNER
Commissioner of Patents and Trademarks